United States Patent [19]

Hall et al.

[11] Patent Number: 5,524,776

[45] Date of Patent: Jun. 11, 1996

[54] LOW INCLINATION PUSH BACK STORAGE RACK SYSTEM

[76] Inventors: Roger W. Hall, 3045 Gloucester St., Lancaster, Pa. 17603; Harold J. Reiter, 2791 Ironville Pike, Columbia, Pa. 17512; David W. Whalen, 101 Nordick Dr., Lancaster, Pa. 17602

[21] Appl. No.: 169,520

[22] Filed: Dec. 17, 1993

[51] Int. Cl.$^6$ ........................................ A47F 5/00
[52] U.S. Cl. .................... 211/151; 211/59.2; 414/276; 414/286
[58] Field of Search ................... 211/151, 59.2, 211/162; 414/276, 286

[56] References Cited

U.S. PATENT DOCUMENTS

| | | | |
|---|---|---|---|
| 2,834,475 | 5/1958 | Reich | 211/113 |
| 4,155,462 | 5/1979 | Bendel | 211/151 |
| 4,341,313 | 7/1982 | Doring | 211/151 |
| 4,462,500 | 7/1984 | Konstant et al. | 211/151 |
| 4,613,270 | 9/1986 | Konstant et al. | 414/276 |
| 4,678,091 | 7/1987 | Konstant et al. | 211/191 |
| 4,687,404 | 8/1987 | Seiz et al. | 414/276 |
| 4,715,765 | 12/1987 | Agnoff | 414/276 |
| 4,759,676 | 7/1988 | Hammond | 414/276 |
| 4,773,546 | 9/1988 | Konstant | 211/151 |
| 4,915,240 | 4/1990 | Konstant | 211/151 |
| 4,949,852 | 8/1990 | Allen | 211/151 |
| 4,955,489 | 9/1990 | Allen | 211/151 |
| 4,982,851 | 1/1991 | Konstant | 211/151 |
| 4,988,251 | 1/1991 | Kinney | 414/276 |
| 5,062,535 | 11/1991 | Potter | 211/162 |
| 5,080,241 | 1/1992 | Konstant | 211/151 |
| 5,117,990 | 6/1992 | Krummell et al. | 211/151 |
| 5,137,159 | 8/1992 | Collins et al. | 211/151 |
| 5,141,118 | 8/1992 | Gay | 211/151 |
| 5,170,896 | 12/1992 | Konstant | 211/151 |
| 5,178,288 | 1/1993 | Werner et al. | 211/151 |
| 5,180,069 | 1/1993 | Krummell et al. | 211/151 |
| 5,184,738 | 2/1993 | Allen | 211/151 |
| 5,203,464 | 4/1993 | Allen | 211/151 |
| 5,312,004 | 5/1994 | Krummell et al. | 211/151 |
| 5,316,157 | 5/1994 | Konstant | 211/151 |
| 5,328,038 | 7/1994 | Allen | 211/151 |
| 5,348,169 | 9/1994 | Allen | 211/151 |

*Primary Examiner*—Robert W. Gibson, Jr.
*Attorney, Agent, or Firm*—Daniel Williams

[57] ABSTRACT

A low inclination push back storage rack system is described, the system having a plurality of storage lanes, each storage lane being equipped with one or more rectangular carriages to transport a pallet load from a front loading position to a rear storage position. Each carriage is provided with axles on which wheels having notches about their peripheral circumference are mounted. The wheels are typically V groove wheels. The V groove wheels of each carriage roll on parallel spaced apart rounded elongated rods, the V groove wheels on one side of the carriage rolling on one elongated rod, the V groove wheels on the other side of the carriage rolling on another elongated rod. The carriages wheels are supported and guided by the elongated rounded rods. The spaced apart parallel rounded elongated rods are supported by spaced apart rod support members extending from the front of the storage lane to the rear of the storage lane. The rod support members may be various structural members such as I beams, channels, and angles. These members are directly supported by the rack framework. Systems are described having a plurality of carriages, these systems having a configuration allowing the carriages to pass each other, one below the other.

20 Claims, 8 Drawing Sheets

LOW INCLINATION PUSH BACK STORAGE RACK SYSTEM

BACKGROUND

Storage rack systems maximize the amount of goods that can be stored in a given floor space. The simplest systems are racks with a plurality of storage lanes placed in a horizontal and vertical array such that each lane can be loaded or unloaded with a forklift from a front aisle. A simple one deep system, open in the front, can be placed against a wall. A front aisle permits a forklift front access to each lane. Although this type of system may conserve floor space by providing additional vertical storage, the aisles used by the maneuvering forklifts consume a great deal of floor space.

Systems capable of storing multiple pallet loads, one behind the other, in the lane further conserve floor space. Rollerways on the lower surface of each lane allows pallets to be sequentially loaded and pushed to rear storage positions in three or more deep systems. Declined rollerways allow the rack systems to be loaded from the front; the pallet loads moving to the rear under the force of gravity. The pallet loads are unloaded from the rear of the rack in a first in-first out basis.

Deep rack, first in-last out, rollerway systems are designed having only front access. The racks are pitched slightly upward so that the pallets return to the loading position under the force of gravity.

However, rollerway storage systems presented problems because loads for storage were customarily contained on wooden pallets. Broken or otherwise defective wooden pallets would jam the rack system necessitating time consuming and expensive hand unloading of the pallet before the rack system was again functional. Moreover, rollerway storage systems were expensive because of the large number of wheels required with each system.

Push back systems are first in-last out systems which employ moving carriages on which loaded pallets are transported to rearward positions to be temporarily stored. The carriages are mounted on flanged wheels which run along parallel tracks that extend from the front to the rear of the storage lane. The tracks are often structural members such as I beams or channels. The wheel flange provides guidance along an edge of the track; the wheel is supported on a flat portion of the structural member. Since the tracks are structural members, the tracks also support and give rigidity to the storage rack system.

Another push back system has the carriages mounted on flat wheels that have the flat roller portion of the wheel at a slight angle off horizontal. This angle mates with a corresponding angle on the structural member, however carriage support is still provided by flat wheels rolling on a flat surface.

Carriages in the pushed back positions were initially urged to return to the front loading position by resilient means. However, it was found that the carriages would return to the front loading position under the force of gravity if the tracks were inclined toward the front loading position.

Use of flanged and flat wheels which ride on structural members causes numerous secondary problems. First, dirt and debris can build up on the track making it necessary to periodically clean the tracks. The debris lays on the flat track and can jam the carriage similar to putting a wedge under the wheel.

Secondly, the tracks must be carefully aligned. If they are too far apart, the carriage may become cocked and jammed. If they are too close together, flanged wheels will jam against the sides of the tracks and flat wheels will jam against the sides of the structural members.

Thirdly, the track inclination must be greater than 3/8" per foot of carriage run. This is necessary because of the large frictional forces between the flanged wheels and the tracks. This large inclination angle causes problems when varying weight loads are placed on the carriages. Carriages with heavier loads return to the front position very rapidly, necessitating a shock absorbing bumper to stop the carriages. Lightly loaded carriages return very slowly or get hung up on track debris.

Finally, a large track inclination or pitch necessarily increases the height of each storage lane. As systems become deeper and more vertical lanes are involved, considerable vertical space is consumed because of excessive track pitch.

In view of the aforementioned difficulties, it is an object of this invention to provide a push back carriage system capable of being used with a degree of track inclination less than 1/4 of an inch per foot.

Another object of this invention is to provide a push back storage rack system that reduces sliding friction between the wheels and tracks thus providing smooth flow at a low pitch or track inclination.

It is also an object of this invention to provide a push back carriage system that is less susceptible to fouling with dirt and debris.

A further object of this invention is to provide a system in which the track spacing tolerances are more generous so that carriages will not jam between the tracks if the tracks are not perfectly parallel and separated by a precisely correct distance.

It is yet another object of this invention to provide a push back system that can be easily retrofitted into existing rack systems by retaining the structural shell of the already existing rack system.

For the foregoing reasons, there is a need for an easily manufactured push back rack storage system that is tolerant of less precise manufacturing standards and yet capable of trouble free operation in dirty environments and that provides easy smooth flowing carriages with minimal vertical height loss.

SUMMARY OF THE INVENTION

The present invention relates to pallet rack storage systems that include a moveable carriage. More particularly, the invention relates to storage systems that employ a moveable carriage for loading, positioning, and storing pallet loads in each lane of a push back storage rack. The moveable carriage is mounted on shoulder bolts or stub axles about which V groove wheels turn. The V groove wheels are supported on and guided by elongated rounded rods extending from a loading position in the storage rack to a storage position in the rack. The elongated rounded rods are supported along their length by conventional hot rolled steel structural members.

This low inclination push back storage rack system may be expanded to permit a plurality of nesting carriages to move on a plurality of rods in a fore and aft direction within a single lane and yet still maintain simplicity of construction and ease of maintenance.

The skeleton of this low inclination push back storage rack system is conventionally framed with main vertical support members extending vertically from a base datum, the base datum usually being the floor of the building. At the front of each lane, a front horizontal structural member is fixedly attached between a pair of front vertical columns. Additional horizontal structural members are supported by more rearwardly positioned pairs of vertical columns. The horizontal structural members define the base of a rearwardly extending lane. Each lane may be two or more pallet loads in depth.

As viewed from the front of the lane, the transverse horizontal members are fixed at progressively higher distances from the base datum so that the more rearward transverse horizontal members in each lane are higher than the more forward transverse horizontal members. All horizontal members in each lane, except the front horizontal member, are aligned so as to define a plane with a slight downward inclination toward the front of the lane. Diagonal members connect the main vertical support members to give racking strength to the push back storage rack.

Fixed to the horizontal members are a pair of parallel rearwardly extending rod support members. Each rod support member is positioned contiguous to the side of the rearwardly extending lane so that each lane has two parallel rearwardly extending rod support members separated by a distance that corresponds to the approximate width of the moveable carriages. The rod support members are attached to and supported by the transverse horizontal members. The rod support members are structural members which support the weight of the movable carriages.

Moveable rectangular carriages support the pallet loads that are loaded from the front of the lane. Shoulder bolts are mounted on the side members of each moveable carriage where the wheels are to be positioned. V groove wheels are mounted on and rotate around the axis of the shoulder bolts, however, sufficient clearance is provided on either side of the wheel to allow the wheels to laterally drift along the axis of the shoulder bolts. The V grooves in the wheels mate with the rearwardly extending elongated parallel rods. Thus, each carriage is supported and guided by its V groove wheels riding on their corresponding and respective rearwardly extending elongated parallel rods. Contact between the V groove in each wheel with its respective supporting rod is at only two points.

This wheel system is self cleaning because the wheels are not rolling on a flat horizontal surface on which debris may easily collect. In this V-groove wheel system, debris slips off the curved upper surfaces of the rods onto the flat surfaces of the rod support members. Debris does not interfere with wheel movement until there is a significant build up of debris on the rod support members.

Another advantage of this low inclination push back storage rack system is that the self cleaning feature allows the carriages to roll freely and uniformly as long as the build up of debris does not rise to the level of the rods. In a conventional flat wheeled system, any debris on the track can cause an impediment to the rolling motion of the carriages.

Yet another advantage of the present invention is that, if the elongated rods are not perfectly parallel, the wheels do not bind on the tracks or rods. Instead, the wheels drift laterally on their respective shoulder bolts thus compensating for alignment deviations between the rods supporting the carriage.

Still another advantage of this system are the low frictional losses provided by the two point contact between the wheel and the rod. This two point contact allows the inclination of the rods to be kept to less than ¼ of an inch per foot, even for lightly loaded carriages. Flat flanged wheels require substantially greater track inclinations to compensate for their higher frictional losses and obstacles caused by minor debris accumulations.

Yet another advantage of this push back system is that the height of each storage lane may be reduced because of the lower track or rod pitch that is used with this low inclination system.

The foregoing advantages of this invention satisfies the need for a low inclination, low height, low friction, push back storage rack system that has wide manufacturing tolerances and yet is capable of trouble free non-jamming operation in a dirty environment.

BRIEF DESCRIPTION OF THE DRAWINGS

These and other features, aspects, and advantages of the present invention will become better understood with regard to the following description, appended claims, and accompanying drawings where:

DESCRIPTION

Figure 1:
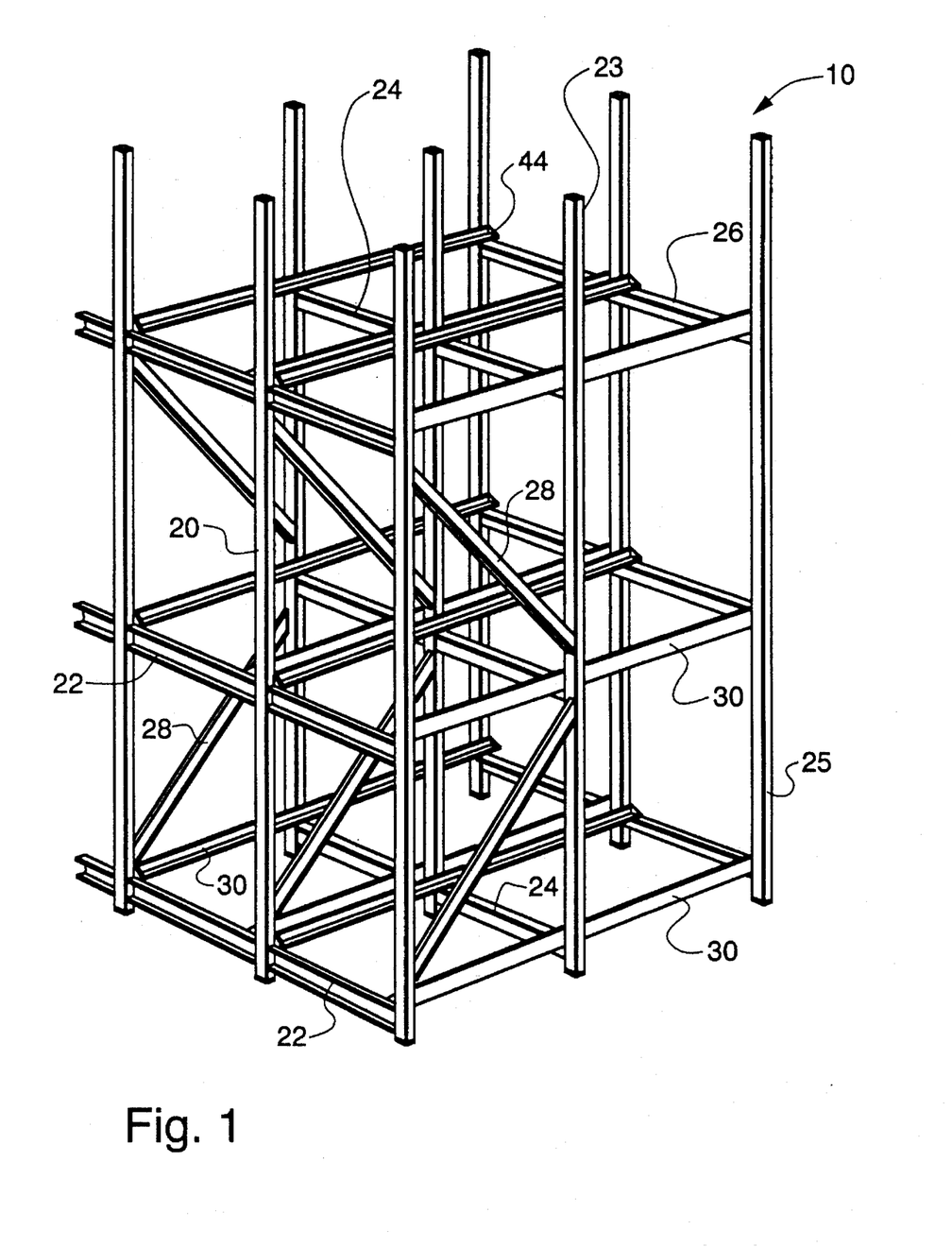
FIG. 1 is a perspective view of the structural skeleton of the low inclination push back storage rack system.
Figure 2:
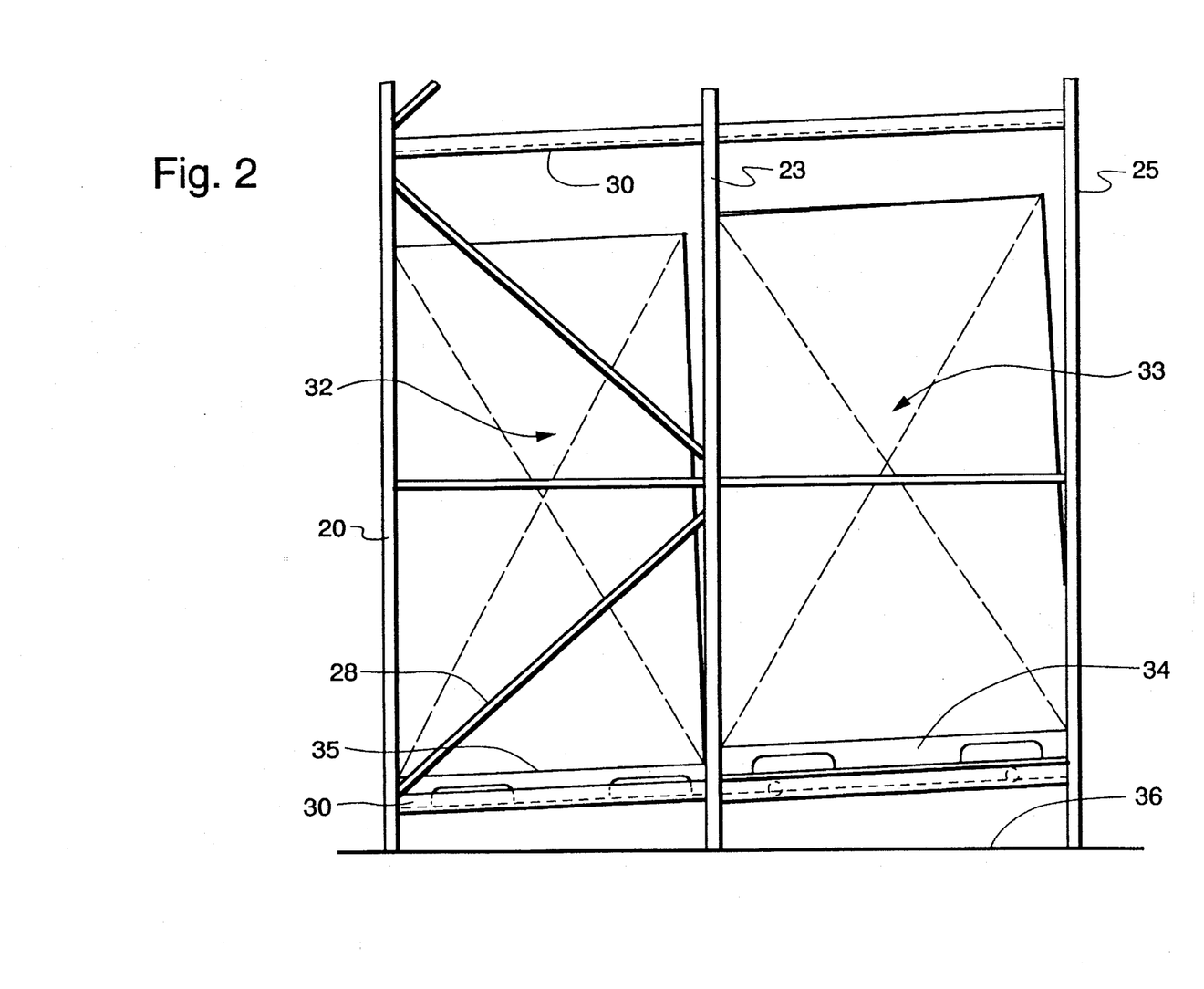
FIG. 2 is a side elevational view of the low inclination push back storage rack system.
Figure 4:
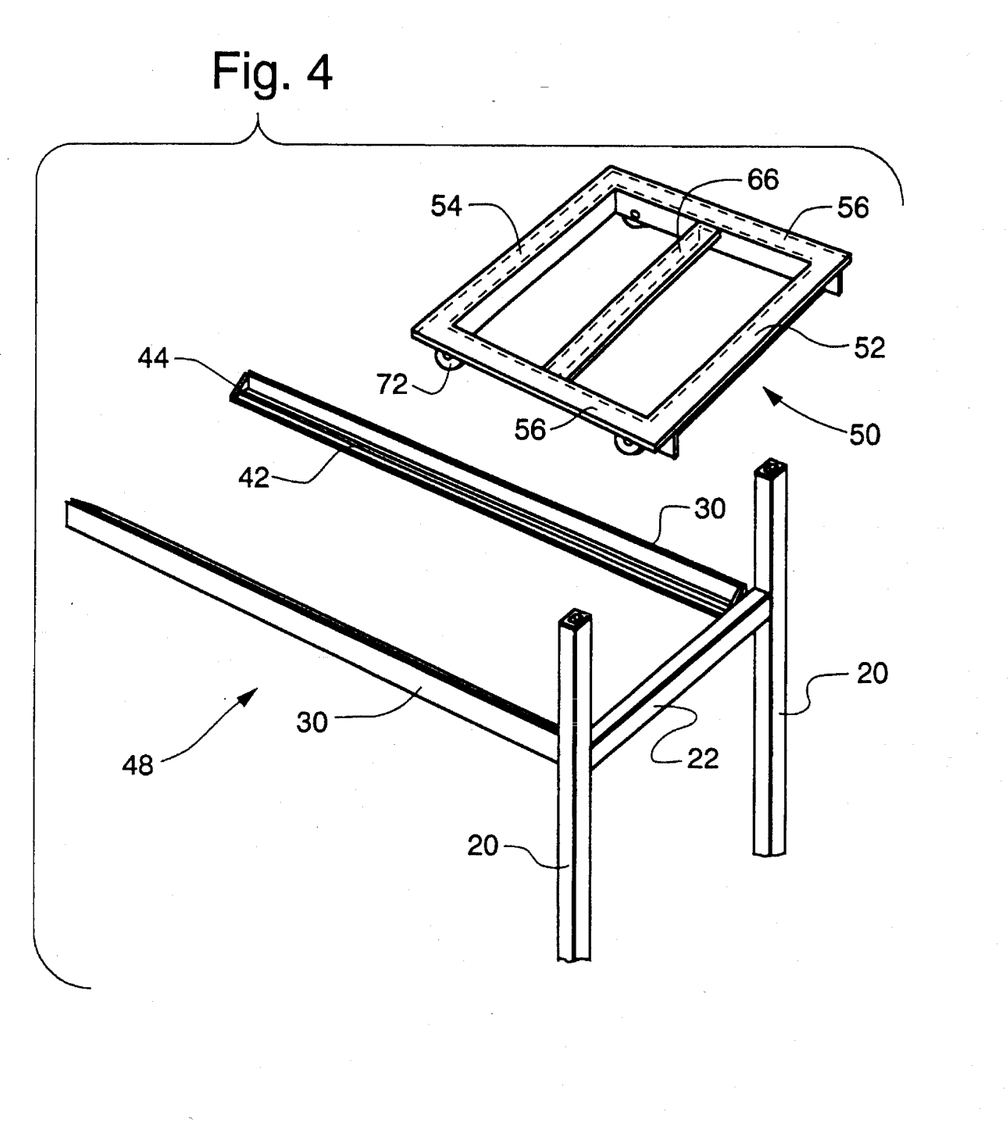
FIG. 4 is an exploded perspective view of the rods, rod supports, and carriage assembly.
Figure 5:
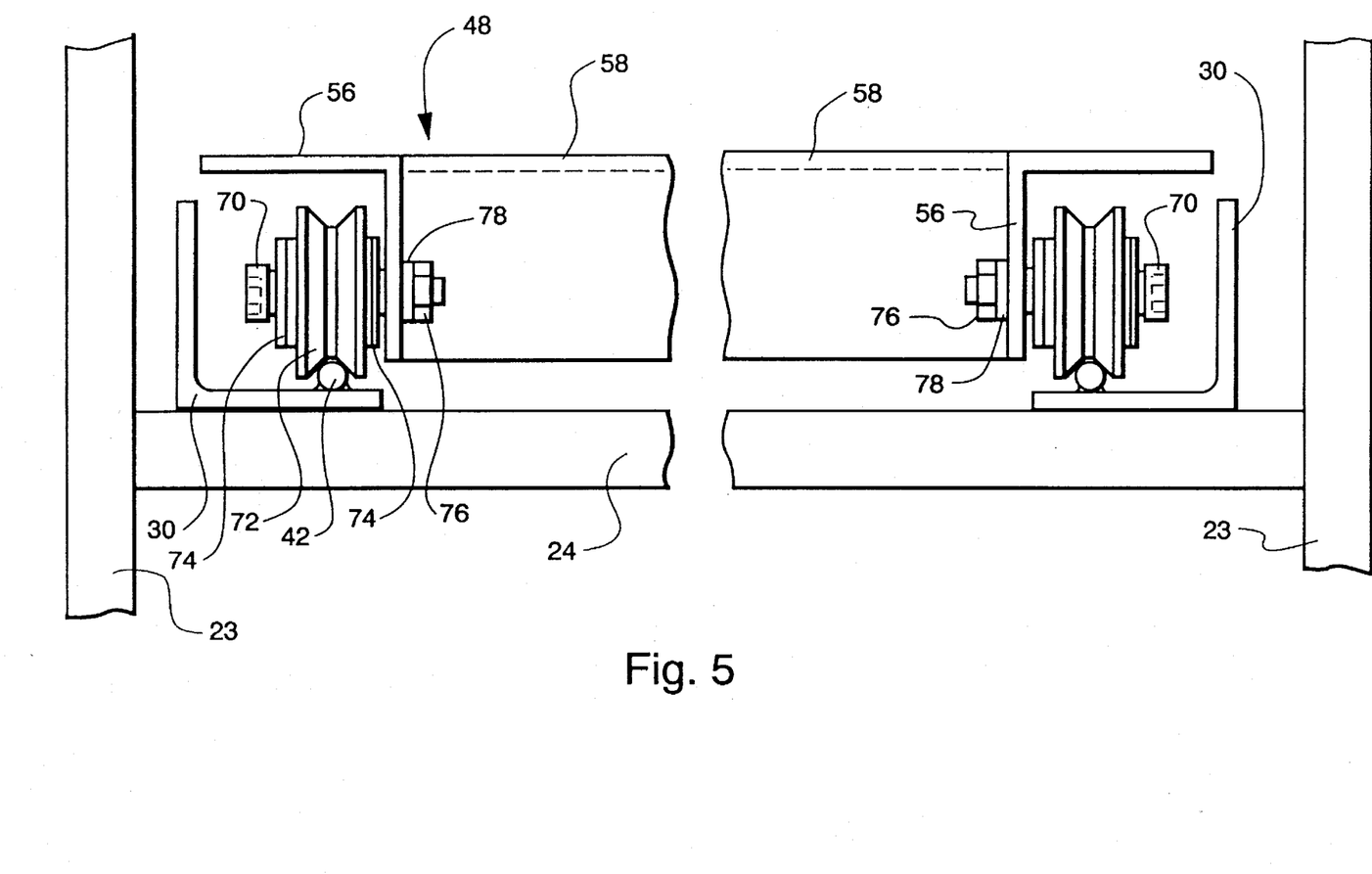
FIG. 5 is an enlarged fragmentary front elevational view of the low inclination push back rack with a single carriage assembly.
Figure 6:
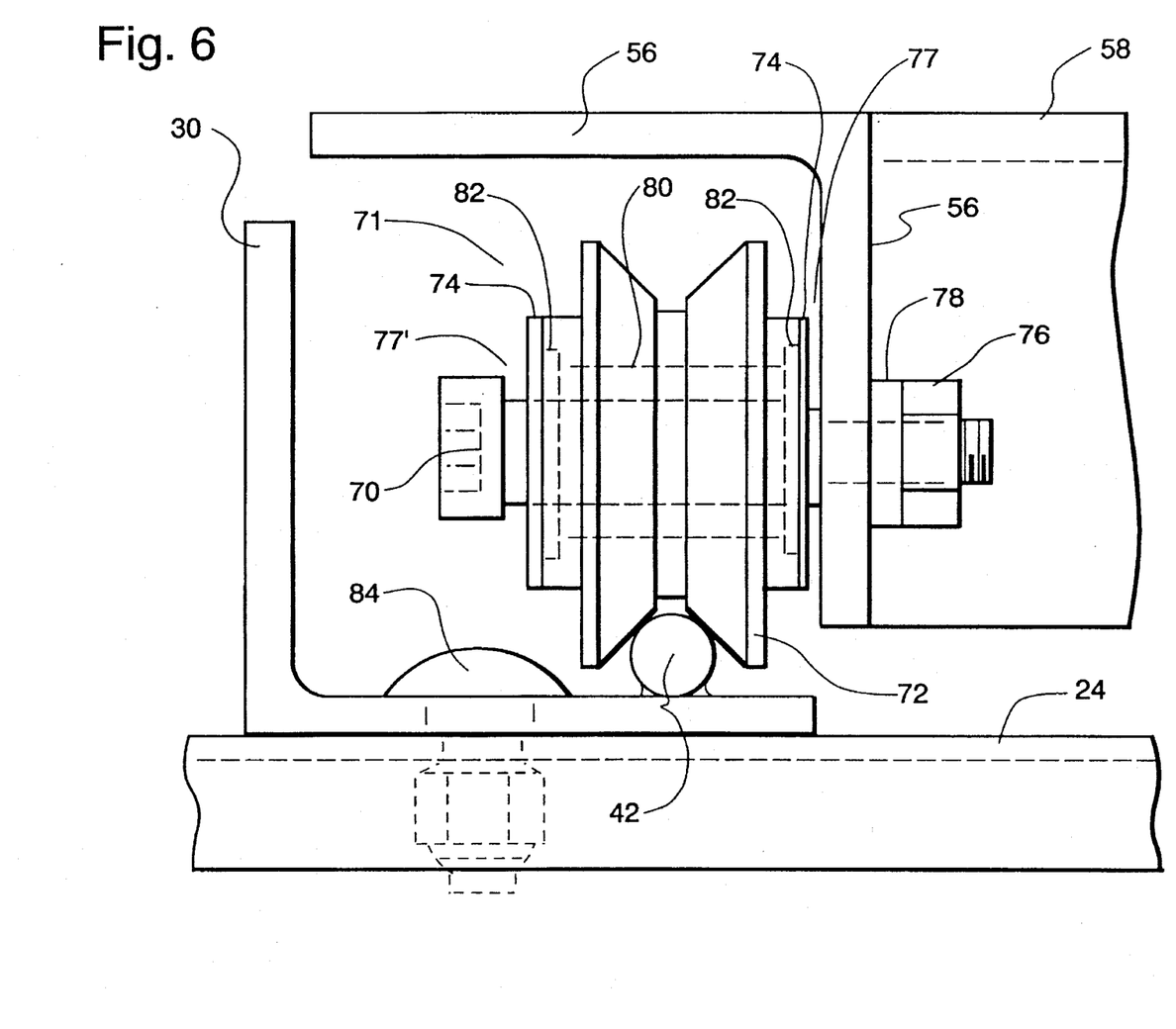
FIG. 6 is an enlarged fragmentary front elevation of the carriage wheel assembly.

The low inclination push back storage rack system comprises of a framework 10, as best seen in FIGS. 1 and 2, having a plurality of horizontally and vertically arranged storage lanes, each storage lane being deep enough to accommodate a plurality of storage pallets 34, and a carriage transport assembly 48, better seen in FIGS. 4, 5, and 6. The carriage transport assembly 48 is installed in each storage lane for the purpose of transporting pallets from the front loading and unloading position to a rear storage position within each lane. The carriage transport assembly 48 also transports the pallets from the rear storage position to the front loading and unloading position. The basic storage rack framework is a two deep storage rack system as seen in FIGS. 1 and 2.

The framework of the system, best seen in FIG. 1, is comprised of vertical columns supporting lateral horizontal framing members. At the front loading end of the storage rack system, a plurality of front horizontal support members 22 are fastened perpendicular to the front vertical columns 20 thus forming the front of the storage array. The front face of the storage rack system presents a plurality of horizontally and vertically grouped storage lanes. Vertically grouped lanes are called a storage bay. A multiplicity of horizontally grouped storage bays comprises the storage array. Pallet loading and unloading is accomplished at the front of each storage lane. The vertical columns are typically roll formed channel members made of hot rolled steel but other structural forms and materials would be suitable. The front horizontal support members 22 are typically a channel shaped hot rolled steel as better seen in FIG. 3, but other structural shapes could also be used. The front horizontal support members 22 are attached to the front vertical columns 20 by removable and detachable clamp means that are well known in the industry, however, any type of rigid attachment means, permanent or otherwise could be employed. The two deep framework of FIG. 1 shows rear horizontal support members 26 attached to the rear vertical columns 25 that are located at the rear of the storage rack system. Similarly, middle vertical columns 23, located between the rear and front columns, support the middle horizontal support members 24. Although FIGS. 1 and 2 show a two deep system, the system can be increased in depth by placing additional middle vertical columns and middle horizontal support members between the front vertical columns 20 and the rear vertical columns 25. The middle and rear horizontal support members can be structural channels similar to the front horizontal support member 22, however roll formed channels and other structural shapes can also be utilized.

As best seen in FIGS. 1 and 2, each storage lane is defined by the space bounded, on its bottom, by its respective front, middle, and rear horizontal support members 22, 24, and 26 and on its sides by its respective front, middle, and rear vertical columns 20, 23, and 25. FIG. 2 illustrates a two deep storage lane that can accommodate two pallet loads, a front pallet load positioned in the front loading position 32, and a rear pallet load 33, stored at the rear storage position.

The base plane of each respective storage lane is defined by the upper surfaces of the middle horizontal support members 24 and the rear horizontal support members 26. The base plane is slightly angled or inclined so as to be the greatest distance from the floor 36 at the rear horizontal support member 26. The base plane is highest at the rear of each storage lane and lowest at the front of each storage lane. The angle or inclination of the base plane is desribed by the vertical distance risen by the base plane between the front and rear of the storage lane divided by the horizontal distance travelled between the front and rear of the storage lane. This inclination or angle is described in inches per foot. The inclination of the base plane is also known as the pitch and is normally between ¼ of an inch per foot to as much as 5/16 inch per foot. An inclination of ¼ inch per foot has been found to be suitable for loads weighing between 200 and 3000 pounds. For lighter loads, the inclination is increase to approximately 5/16 inch per foot.

The lower surfaces of the rod support members 30 rest directly on the middle and rear horizontal support members 22, 24 and thus are directly on the base plane. The front horizontal support member 22 is constructed of a channel member, the material of which is usually hot rolled steel.

Figure 3:
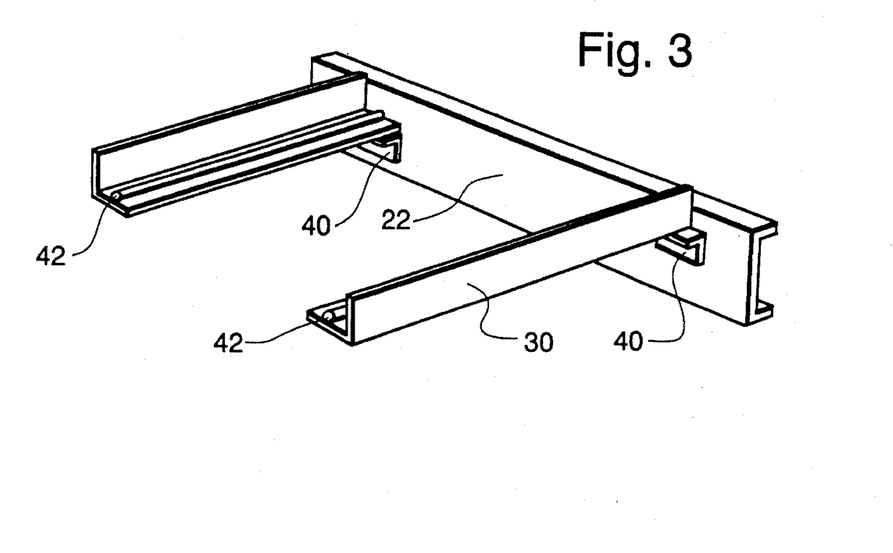
FIG. 3 is a fragmentary perspective view of the rear side of the front horizontal support member of the rack of FIG. 2.

As best seen in FIG. 3, the front horizontal support member 22 is mounted at a level so that the rod support members 30 intersect the front horizontal support member 22 at a position that leaves sufficient space for attachment of the front angles 40. As will be later described, the front horizontal support member 22 also acts as a positive stop for the front carriage member 52 making it necessary for the front angles 40 to be mounted several inches below the upper flange of the front horizontal support member 22. When carriage assembly 50 rolls forward, the front carriage member 52 impacts against front horizontal support member 22 causing carriage assembly 50 to stop. The rod support members 30 are supported at the front horizontal support members 22 by front angles 40 which are welded, bolted, or otherwise permanently attached to the rear side of the front horizontal support member 22. The front angles 40 provide support for the rod support members 30, which are bolted, welded or otherwise permanently attached to the front angles. Installing the front horizontal support 22 channel with the open portion of the channel toward the front of the storage rack and the wide flange vertically aligned and positioned toward the inside of the storage lane allows easy installation of the front angles 40.

To increase rigidity, the framework is equipped with suitably placed diagonal struts 28. Diagonal struts 28 are fixedly attached to the front vertical columns 20 and the middle vertical columns 23. Struts may also be placed between middle vertical columns 23 and the rear vertical columns 25 or at any other locations providing the struts 28 do not interfere with the passage of pallet loads within a storage lane.

Within each lane is mounted a pair of spaced apart rod support members 30 that extend from the front of the storage lane to the rear of the storage lane. The rod support members 30 are mounted on the middle horizontal support member 24 and rear horizontal support member 26. As previously described, the bottom of the rod support members 30 intersect the vertical webb of the front horizontal support member 22. Where the rod support members 30 rest on middle horizontal support members 24 or the rear horizontal support member 26, the rod support member is fastened with carriage bolts 84 or other permanent means such as welding.

Rod support members 30 are made of a strong low cost material such as simple hot rolled steel angle iron. Other types of structural members such as channels or I beams may also be used. The most rearward end of the rod support member 30 has a rear closure 44 welded at its end, as best seen in FIG. 1 and FIG. 4. The purpose of the rear closure 44 is to close off the rear end of the rod support member 30 and act as a positive stop to prevent carriage assembly 50 from rolling out the rear of the storage rack.

Figure 3A:
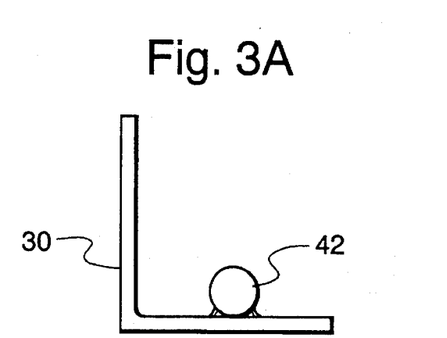
FIG. 3A is an enlarged fragmentary cross section of the rod and rod support member of FIG. 3.
Figure 3B:
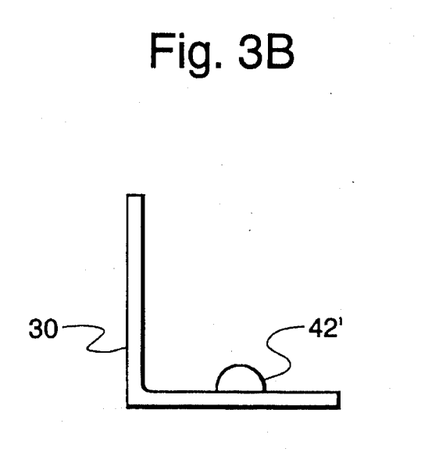
FIG. 3B is an enlarged fragmentary cross section of the rod and rod support member of FIG. 3 showing an alternative rod structure.

Elongated rounded rods 42 are positioned on the upper surfaces of the rod support members 30 as best seen in FIG. 5. The elongated rounded rods 42 are mounted, one on each rod support member 30, parallel to one another and spaced so as to receive the V groove wheels 72 of the carriage assembly 50 as shown in FIG. 4. Rods 42 are tack welded to rod support members 30, however other permanent fastening means may also be used. It has been found that the most suitable elongated rounded rods 42 are simple round rods made of cold rolled steel as shown in FIG. 3A. However, it also is possible to use rods of any material or of any cross sectional shape providing the shape has a round, oval, ellipsoid or otherwise generally rounded surface which may be mounted facing in an upward direction. For example, half round 42' is shown mounted on rod support member 30 in FIG. 3B. For example, the rods could have an oval cross section or be a half oval or half rounded provided that the upper surface of the rods 42 that contacts the wheels 72 has a round, oval, ellipsoid, or otherwise rounded surface.

Carriage assemblies 50, as shown in FIG. 4, comprise a rectangular assembly of front carriage member 52 and rear carriage member 54 joined by carriage side members 56. The front carriage member defines the front end of the carriage assembly and the rear carriage member defines the rear end of the carriage assembly. The carriage members are angle members made of a suitable material such as hot rolled steel, however other forms such as channels or bar stock and materials such as cold rolled steel or aluminum may also be suitable. The carriage assemblies 50 are fastened together in some permanent fashion, typically welding, thus forming a rectangular assembly. As best seen in FIG. 5, the carriage side members 56, or side rails as they can also be referred to, have the flat horizontal flange extending toward the outside of the carriage assembly. The flat upper surface of the carriage assembly defines a pallet receiving surface 58. In some instances, it may be desirable to add reinforcing members 66, FIG. 4, to the center of the carriage assembly 50. The reinforcing members 66 may be angled members with a flat flange disposed on the pallet receiving surface 58. The reinforcing members 66 strengthen the carriage assemby 50 and provide better support for the pallet load 33.

As best seen in FIG. 6, holes are drilled in the carriage side members 56 to permit shoulder bolts 70 to be mounted on the side members 56. Wheel assemblies 71 are rotationally mounted on shoulder bolts 70. Of course, shoulder bolts 70 are merely axles on which the wheel assemblies 71 rotate. Any axle means that would rotatably support wheel assembly 71 would suffice. The wheel assemblies 71 are comprised of a grooved wheel 72, an inner bearing 80 mounted within the bore of the wheel 72, and plugs 82 mounted in recesses at either side of the wheel 72. Wheel 72 is preferably a V groove type wheel but other groove shapes, such as circular or oval, or other notch shapes may be found satisfactory. The plugs 82 are washer shaped, having an inside diameter sufficiently large to allow the shoulder bolt 70 to pass and an outside diameter larger than that of the inner bearing 80. The plugs 82 trap the inner bearing 80 within the wheel 72.

The wheel assemblies 71 are mounted on shoulder bolts 70 by disposing the wheel assemblies 71 between washers 74. The inside diameter of washers 74 is large enough to allow clear passage of shoulder bolt 70. As best seen in FIG. 6, shoulder bolt 70 is positioned so that its shoulder is disposed against carriage side member 56. When shoulder bolt 70 is tightened with nut 76 there are lateral clearances 77 and 77' that allow wheel 72 to rotate freely. The sum of clearances 77 and 77' approximates one quarter of an inch. The clearances allow the wheel assemblies 71 to drift back and forth along the length of the shoulder of shoulder bolt 70. The drifting movement of the wheel assemblies 71 compensates for inaccuracies in parallelism between rods 42. In order to prevent the shoulder bolts 70 from loosening during carriage movement, the shoulder bolts are equipped with lock washer 78 and nut 76. Socket head shoulder bolts have been found to be the most convenient to use. Hex head shoulder bolts or other types could also be utilized. It is also possible to substitute self locking nuts for the lock washer and nut arrangement previously described. Wheels 72 are mounted on the carriage side members 56 so that the V grooves of the wheels 72 on each side member 56 are in alignment and roll on the same rod 42. As shown in FIG. 5, the V groove wheels 72 on each side member 56 are supported by rods 42 resting on the rod support members 30. Minor differences in wheel spacing is compensated for by the previously described wheel drift.

Each V groove wheel 72 contacts its respective mating rod 42 at two points. Moreover, contact between wheel 72 and rod 42 are at a position sufficiently above the rod support member 30 that no debris collects on the rod. With no debris to interfere with wheel movement and with the low friction caused by the two point contact between the V groove wheel 72 and rod 42, the pitch or inclination of the rod support members 30 and rods 42 is minimized. A pitch of ¼ inch per foot has been found sufficient for pallet loads weighting between 200 and 1500 pounds. Very lightly loaded carriages may require an inclination of up to 5/16 inch per foot. Velocity of the carriage assembly 50 in rolling forward is low and shock absorbing means to cushion the impact of the carriages 50 against the front horizontal support member 22 is unnecessary. In this system, the carriages are stopped by front carriage member 52 contacting front horizontal support member 22.

A major benefit of this low inclination push back storage rack system is that it consumes less overhead space than systems which utilize flanged wheel or flat wheel rail systems. Flanged and flat wheel rail systems need greater inclination to compensate for debris build up and higher frictional losses caused by the large contact area between the wheel and rails. The low inclination directly translates to lowering the overhead requirements of a given depth system.

If a given storage lane is empty, carriage 50 is in the front loading position having previously returned to that position under the force of gravity. A first pallet load is placed on the carriage. A second pallet load is lifted, typically by a forklift, and moved to a position adjacent to the first pallet load at the mouth of the storage lane. The second pallet load is now pushed against the first pallet load, pushing the first pallet load and the carriage assembly upon which it rests to the rear storage position. At this point the first pallet load is rear pallet load 33, as shown in FIG. 2, and the pallet on which it is supported is rear pallet 34.

The forklift then lowers the second pallet load. The second pallet load is front pallet load 32 which is resting on front pallet 35. Front pallet 35 is supported by the rod support members and rods in the front storage location.

Unloading the pallets is begun by a forklift elevating front pallet 35 and withdrawing it from the push back rack. As this withdrawal is accomplished, the carriage 50 supporting the rear pallet load 33 in the rear storage position rolls, under the force of gravity, to the front storage position is available for removal.

This invention contemplates additional middle vertical columns 23 and middle horizontal support members 24 being placed between the front and rear of the storage lane to increase the depth of the storage lane. Increasing the depth of the lane allows three pallet loads to be stored in the lane. However, when three pallet loads are stored, carriage assemblies must be provided to transport two of the pallet loads in a rearward direction.

Figure 5A:
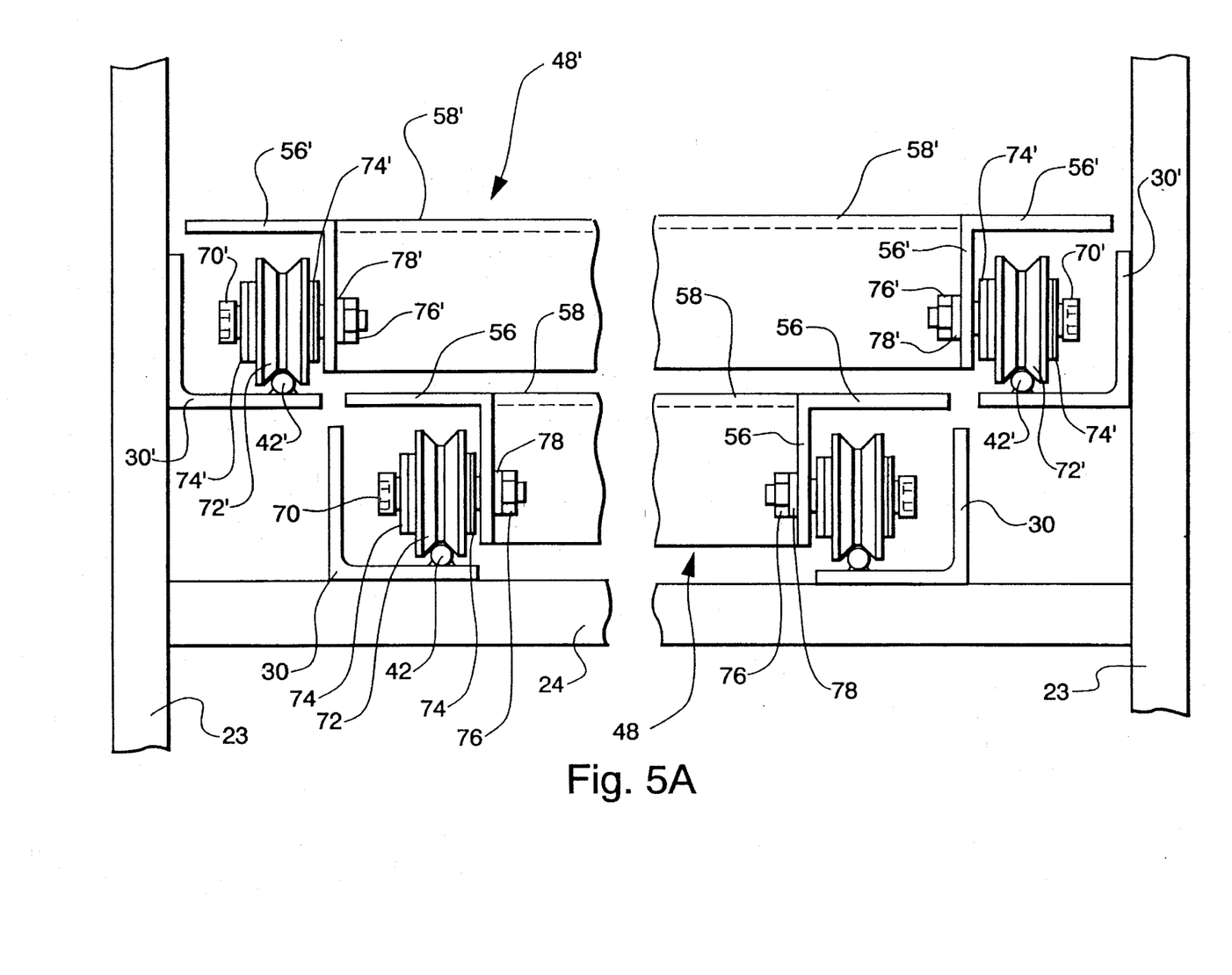
FIG. 5a is an enlarged fragmentary front elevational view of the low inclination push back rack with two nesting carriage assemblies.
Figure 7:
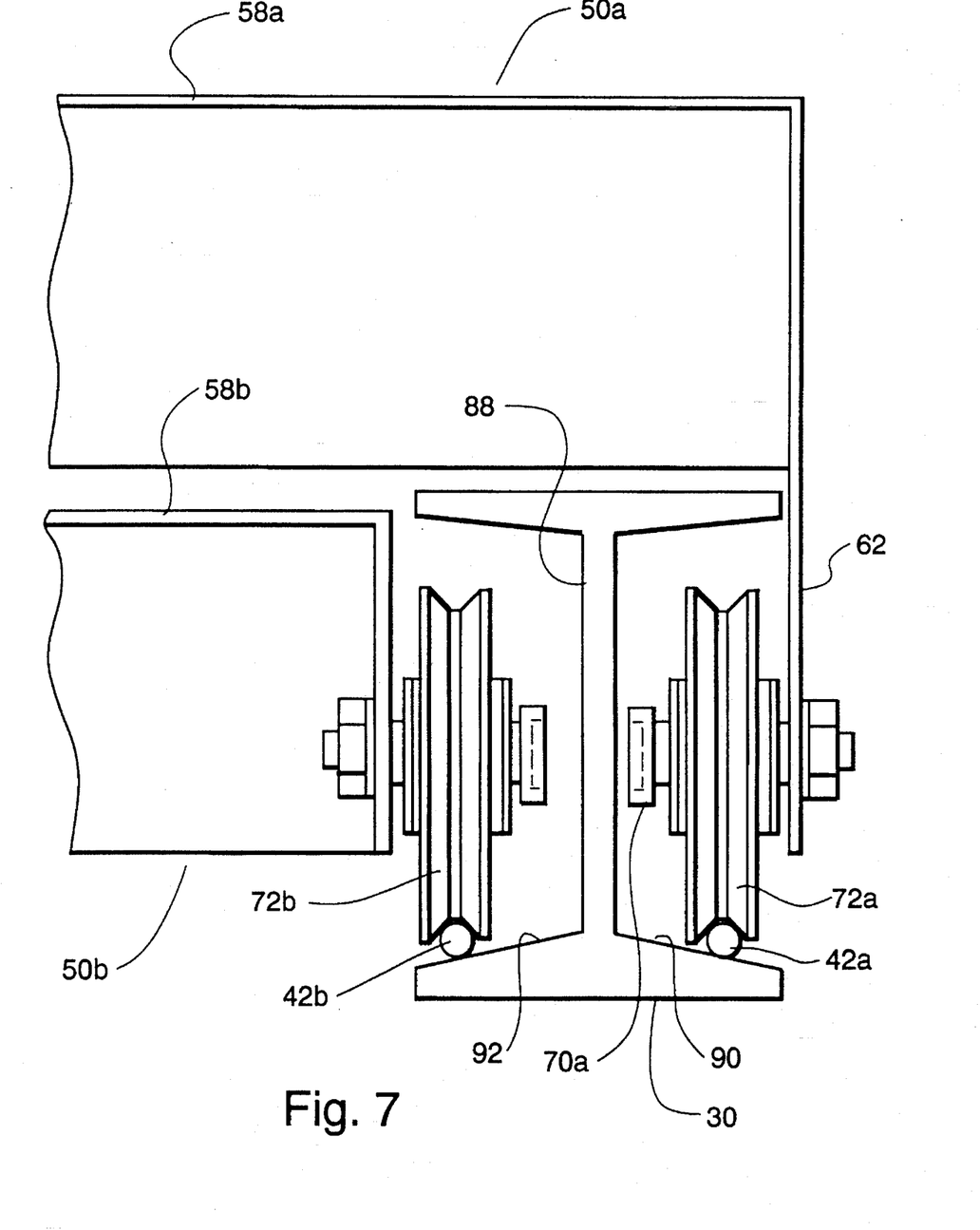
FIG. 7 is an enlarged fragmentary front elevational view showing an alternative scheme for mounting two carriages on an I beam.

The number of carriages may be increased by mounting a plurality of rod support members 30 in each storage lane as shown in FIGS. 5a and 7. FIG. 5a shows a second pair of rod support members 30' and rods 42' mounted directly on the vertical columns. Such attachment is by bolting, welding, or otherwise permanently affixing the vertical flange of rod support members 30' to the vertical columns. Rod support members 30' are placed high enough on the vertical columns so there is sufficient clearance for the pallet receiving surface 58 of the lower carriage assembly 48 to pass under the upper carriage assembly 48'.

An alternative scheme for mounting carriages that pass one beneath the other is shown in FIG. 7. Here the rod support member 30 is beam 88 which may be an I beam. Rod 42a is welded or otherwise permanently attached to the upper surface of the lower outer flange 90. Rod 42b is welded or otherwise permanently attached to the upper surface of the lower inner flange 92. Upper carriage assembly 50a is modified to include extension member 62 to which shoulder bolt 70a is bolted. Extension member 62 provides the vertical clearance necessary for upper carriage assembly 50a to clear the upper flange of the beam 88 and lower carriage assembly 50b.

In configurations utilizing two carriage assemblies, the carriages originally nest in the first storage location of the storage lane. The first palletized load is placed on the uppermost carriage. A second subsequently positioned palletized load pushes the uppermost carriage rearwardly and the second load is placed on the lower carriage. A third palletized load is then pushed against the second load thus moving both the first and second loads and their supporting carriages rearwardly. The third load is then placed directly on the rods and rod support members. Load removal is a simple reversal of the process.

It should be understood that the above described preferred embodiment of the invention is not intended to limit the scope of the invention and that changes and modifications can be made to the described embodiment without departing from the spirit and scope of the appended claims.

What is claimed is:

1. A low inclination push back storage rack system having a plurality of storage lanes defined by a plurality of vertical columns supporting a plurality of horizontal support members each of the storage lanes comprising:

(a) a first and a second spaced apart elongated rod support member, each rod support member extending from the front of the lane to the rear of the lane, each of said rod support members fixed to the horizontal support members;

(b) a first and a second spaced apart elongated rod, the first elongated rod being fixed to the first rod support member, the second elongated rod being fixed to the second rod support member, the elongated rods being parallel and extending from the front of the lane to the rear of the lane;

(c) a carriage assembly having a carriage frame further comprising front and rear members defining a front and rear end, first and second side rails, a pallet receiving surface, a first pair of axles disposed perpendicular to the side rails and positioned toward the front end of the carriage frame, a second pair of axles disposed perpendicular to the side rails and positioned toward the rear end of the carriage frame, a plurality of wheels, each wheel being rotationally mounted on its respective axle and each wheel having a concave notch extending around the peripheral circumferential surface of the wheel, said wheels being in contact with the elongated rods so that the concave notch of each wheel rests on and is guided by the respective elongated rod of which that wheel contacts.

2. The push back storage rack system of claim 1 wherein the wheels have V grooves extending around the peripheral circumferential surface of the of the wheel.

3. The push back storage rack system of claim 2 wherein the elongated rods have a circular cross section.

4. The push back storage rack system of claim 2 wherein the elongated rods have a half round cross section.

5. The push back storage rack system of claim 3 wherein the elongated rod support members have two flanges, said flanges being permanently joined together to form an angle member.

6. The push back storage rack system of claim 4 wherein the elongated rod support members are angle members.

7. The push back storage rack system of claim 3 wherein the elongated rod support members are I beams.

8. The push back storage rack system of claim 4 wherein the elongated rod support members are I beams.

9. A push back storage rack system having a plurality of storage lanes defined by a plurality of vertical columns supporting a plurality of horizontal support members each of the storage lanes comprising:

(a) a first and a second spaced apart elongated rod support member, each rod support member extending from the front of the lane to the rear of the lane, each of said rod support members fixed to the horizontal support members;

(b) a third and a fourth spaced apart elongated rod support member, the third and fourth rod support members extending from the front of the lane to the rear of the lane and being fixed to and supported by the vertical columns;

(c) a first and a second spaced apart elongated rods, the first elongated rod being fixed to the first rod support member, the second elongated rod being fixed to the second rod support member, the elongated rods being parallel and extending from the front of the lane to the rear of the lane;

(d) a third and fourth spaced apart elongated rods, the third elongated rod being fixed to the third rod support member, the fourth elongated rod being fixed to the fourth rod support members, the third and fourth elongated rods being parallel and extending from the front of the lane to the rear of the lane;

(e) a first and a second carriage assembly, each carriage assembly having a carriage frame further comprising front and rear members defining a front and rear end, first and second side rails, a pallet receiving surface, a first pair of axles disposed perpendicular to the side rails and positioned toward the front end of the carriage frame, a second pair of axles disposed perpendicular to the side rails and positioned toward the rear end of the carriage frame, a plurality of wheels, each wheel being rotationally mounted on its respective axle and each wheel having a concave notch extending around the peripheral circumferential surface of the wheel, said wheels being positioned on the elongated rods so that the concave notch of the wheels rests on and is guided by the corresponding elongated rods on which its wheel rides, the wheels of the first carriage assembly resting on and being guided by the first and second elongated rods, the wheels of the second carriage assembly resting on and being guided by the third and fourth elongated rods, the second carriage assembly being arranged to pass over the first carriage assembly.

10. The push back storage rack system of claim 9 wherein the wheels have V grooves extending around the peripheral circumferential surface of the wheel.

11. The push back storage rack system of claim 10 wherein the elongated rods have a circular cross section.

12. The push back storage rack system of claim 10 wherein the elongated rods have a half round cross section.

13. The push back storage rack system of claim 11 wherein the elongated rod support members are angle members.

14. The push back storage rack system of claim 12 wherein the elongated rod support members are angle members.

15. A push back storage rack system having a plurality of storage lanes defined by a plurality of vertical columns supporting a plurality of horizontal support members each of the storage lanes comprising:

(a) a first and a second spaced apart rod support member, each rod support member extending from the front of the lane to the rear of the lane, each of said rod support members having a plurality of flanges and being supported by the horizontal support members in that lane;

(b) a first pair of elongated rods, each of said first pair of rods being affixed to a corresponding flange on a different rod support member, the elongated rods being parallel and extending from the front of the lane to the rear of the lane;

(c) a second pair of elongated rods, each of said second pair of rods being affixed to a corresponding flange on a different rod support member, the elongated rods being parallel and extending from the front of the lane to the rear of the lane;

(d) a first carriage assembly having a carriage frame further comprising front and rear members defining a front and rear end, first and second side rails, a pallet receiving surface, a first pair of axles disposed perpendicular to the side rails and positioned toward the front end of the carriage frame, a second pair of axles disposed perpendicular to the side rails and positioned toward the rear end of the carriage frame, a plurality of wheels, each wheel being rotationally mounted on its respective axle and each wheel having a concave notch extending around the peripheral circumferential surface of the wheel, said wheels being positioned on the elongated rods so that the concave notch of the wheels rests on and is guided by the corresponding elongated rods on which the wheel rides, the wheels of the first carriage assembly resting on and being guided by the first pair of elongated rods;

(e) a second carriage assembly having a carriage frame further comprising of front and rear members defining a front and rear end, a plurality of side rails attached to and joining the front and rear members, a plurality of extension members downwardly disposed from said side rails, a first pair and a second pair of axles, each axle attached to and laterally disposed outwardly from its respective said extension member, the first pair of axles being positioned toward the front end of the carriage frame, the second pair of axles being positioned toward the rear end of the carriage frame, a plurality of wheels, each wheel being rotationally mounted on its respective axle and each wheel having a concave notch extending around the peripheral circumferential surface of the wheel, said wheels being positioned on the elongated rods so that the concave notch of the wheels rests on and is guided by the corresponding elongated rods on which its wheel rides, the wheels of the second carriage assembly resting on and being guided by the second pair of elongated rods.

16. The push back storage rack system of claim 15 wherein the wheels have V grooves extending around the peripheral circumferential surface of the wheel.

17. The push back storage rack system of claim 16 wherein the elongated rods have a circular cross section.

18. The push back storage rack system of claim 16 wherein the elongated rods have a half round cross section.

19. The push back storage rack system of claim 17 wherein the elongated rod support members are I beams.

20. The push back storage rack system of claim 18 wherein the elongated rod support members are I beams.

* * * * *